США Patent Office 3,558,721
Patented Jan. 26, 1971

3,558,721
METHOD FOR THE PREPARATION OF
FLUORINATED ETHERS
Charles Cheng-Yu Yao, Newark, N.J., assignor to Allied
Chemical Corporation, New York, N.Y., a corporation
of New York
No Drawing. Filed Dec. 22, 1967, Ser. No. 692,694
Int. Cl. C07c 41/04, 41/06
U.S. Cl. 260—614                                     7 Claims

ABSTRACT OF THE DISCLOSURE

In a method for preparing fluorine-containing ethers of the formula

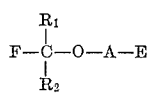

wherein $R_1$ and $R_2$ are independently either fluorine or certain fluorine-containing aliphatic radicals, or, taken together, form a fluorine-containing cycloaliphatic structure, with the proviso that only one of $R_1$ or $R_2$ may be fluorine, wherein A is a linear, branched chain or cyclic alkylene or haloalkylene radical, and wherein E is Cl, Br or I, by reacting a fluorinated ketone or acyl fluoride with an ionizable inorganic fluoride to form an organic fluoride salt, and reacting the organic fluoride salt with an olefin and a halogen to form the fluorine-containing ether, yields are improved, reaction times are shortened, and by-product formation is reduced by improvements comprising use of superatmospheric reaction pressure, or use of superatmospheric reaction pressure together with observation of certain critical reactant molar ratios, and/or operation within certain temperature limits.

CROSS-REFERENCES TO RELATED APPLICATIONS (1) Copending application of Litt et al., Ser. No. 492,276, filed Oct. 1, 1965, now Pat. No. 3,453,333, "Fluorinated Ethers."

(2) Copending application of Litt et al., Ser. No. 513,574, filed Dec. 13, 1965, now Pat. No. 3,470,256, "Fluorinated Ethers."

(3) Copending application of Anello et al., Ser. No. 633,359, filed Apr. 25, 1967, "Telomers and Process for the Preparation Thereof."

BACKGROUND OF THE INVENTION

This invention relates to improvements in a method for preparing fluorine-containing ethers represented by the general formula

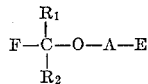

wherein $R_1$ and $R_2$ are independently either fluorine or fluorine-containing aliphatic radicals, or taken together, form a fluorine-containing cycloaliphatic structure, with the proviso that only one of $R_1$ and $R_2$ may be fluorine, wherein A is a linear, branched chain, or cyclic alkylene or haloalkylene radical, and wherein E is Cl, Br, or I.

Preparation of fluorine-containing ethers in two steps, by first reacting an appropriate halogenated ketone or halogenated acyl fluoride with an ionizable fluoride salt to form a fluorinated organic salt, and then reacting the fluorinated organic salt with an olefin and a halogen other than fluorine to form the desired ether, is described in copending applications of Litt et al., Ser. No. 492,276, filed Oct. 1, 1965, now Pat. No. 3,453,333, and Ser. No. 513,574, filed Dec. 13, 1965, now Pat. No. 3,470,256, and of Anello et al., Ser. No. 633,359, filed Apr. 25, 1967, the pertinent subject matter of which is hereby incorporated by reference.

The fluorinated ethers which may be prepared in accordance with the improved method of this invention have at least one halogen substituent other than fluorine as a potential reactive site, as well as at least three fluorine atoms, and are thus useful as intermediates for the preparation of other fluorinated compounds. So, for instance, these fluorinated ethers can be converted into fluorinated acids useful as surfactants by first reacting them with magnesium to form a Grignard reagent, reacting this Grignard reagent with $CO_2$ to form a magnesium halide salt, and then acidifying the magnesium halide salt to form the corresponding fluorinated carboxylic acid. These fluorinated acids and the alkali metal salts thereof lower the surface tension of water and are thus useful as surfactants.

Those fluorine-containing ethers which have a terminal haloisoalkyl group are also valuable telogen starting materials of unusual reactivity, thus provide an improved means for obtaining low molecular weight telomers useful as insulator and condenser fluids, hydraulic fluids, lubricants, heat transfer media, and as intermediates in the preparation of useful surfactants and polycrylate oil and stain repellent agents. These telomers and their preparation are described in copending application of Anello et al., Ser. No. 633,359, filed Apr. 25, 1967.

Fluorine-containing ethers represented by the general formula

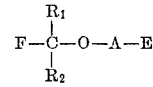

wherein:

(a) $R_1$ and $R_2$ are independently either fluorine or a

radical wherein $R_3$ and $R_4$ are Cl, F, or alkyl or haloalkyl groups or, taken together, are alkylene or haloalkylene groups forming a cycloaliphatic structure, with the proviso that at least one of $R_1$ and $R_2$ is

(b) A is a member selected from the group consisting of radicals of the formulae:

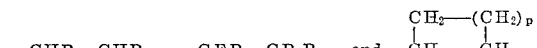

wherein $R_5$ and $R_6$ are independently selected from the group consisting of Cl, H, and alkyl; $R_7$ and $R_8$ are independently selected from the group consisting of F and H; $R_9$ is selected from the group consisting of F, H, Cl, Br, and perfluoroalkyl; $p$ is an integer of from 1 to 9; with the proviso that when both $R_8$ and $R_9$ are F, $R_7$ is always F, and wherein, (c) E is selected from the group consisting of chlorine, bromine, and iodine, according to the co-pending applications of Litt et al. and Anello et al. referred to, supra., may be prepared by reacting a ketone or acyl fluoride having the formula

wherein $R_1$ and $R_2$ have the aforestated meanings, with an ionizable fluoride salt MF, wherein M is a member selected from the group consisting of potassium, cesium, silver, rubidium, and tetraalkylammonium ions, to form a fluorinated organic salt according to the equation (I)
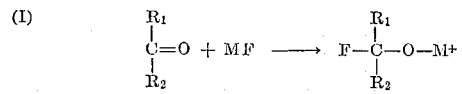

and reacting the fluorinated organic salt so formed with
(a) an olefin selected from the group of olefins having the formulae

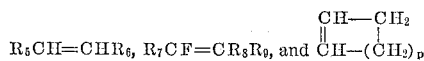

wherein $R_5$, $R_6$, $R_7$, $R_8$, $R_9$ and $p$ have the aforestated meanings, and
(b) a halogen E selected from the group consisting of chlorine, bromine, iodine, and diatomic interhalogens thereof according to the equations (II) (a)
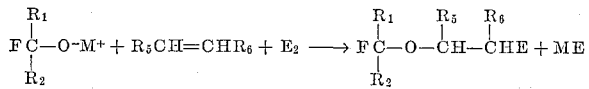

(b)
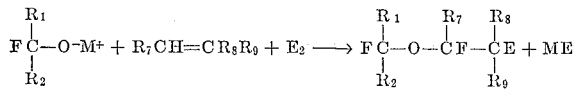

(c)
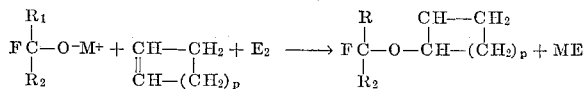

In the reaction of the fluorinated organic salt with an olefin and a halogen two reactions can take place concurrently, viz. the desired main reaction of the fluorinated organic salt with the olefin and halogen to form the desired fluorine-containing ether, and an undesirable side reaction of the olefin with the halogen to form a halogenated alkane. Illustrated below are the main and side reactions occurring when the potassium salt of hexafluoroacetone is reacted with tetrafluoroethylene and iodine:

Main Reaction

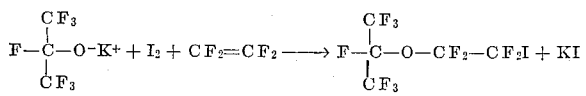

Side Reaction

The side reaction is highly undesirable because it not only consumes expensive raw materials, but also causes contamination of the product and reduces the yield of the fluorine-containing ether.

If the process disclosed in the copending Litt et al., and Anello et al. applications is followed, the reactions illustrated by Equations II(a), II(b), and II(c) require relatively long reaction times and give relatively low yields. So, for instance, in the reaction of the potassium salt of hexafluoroacetone with tetrafluoroethylene and iodine at atmospheric pressure and temperatures between about 25° and about 50° C., reaction times in the order of 15 to 20 hours are required and yields of less than about 20 percent of the desired perfluoroisopropoxyethyl iodide are obtained. When other reactants within the purview of the present invention are employed in the reaction under similar process conditions, similarly long reaction times are required and similarly low yields are obtained.

It is an object of the present invention to provide improvements in a method for the preparation of the above-described ethers resulting in shortened reaction times.

It is another object of the present invention to provide improvements in a method for the preparation of the above-described ethers resulting in minimized by-product formation.

It is yet another object of the present invention to provide improvements in a method for the preparation of the above-described ethers resulting in improved yields and shortened reaction times.

It is a further object of the present invention to provide improvements in a method for the preparation of the above-described ethers resulting in improved yields, shortened reaction times, and minimized by-product formation.

Additional objects and advantages of the present invention will be apparent from the following detailed description thereof.

SUMMARY OF THE INVENTION

I have now discovered that when the reactions illustrated above by Equations II(a), II(b), and II(c) are conducted under superatmospheric pressures of at least about 10 p.s.i.g. yields of the desired product are unexpectedly substantially improved, and reaction times are substantially reduced.

I have made the further discovery that in these reactions, conducted under superatmospheric pressures of at least about 10 p.s.i.g., with decreasing reaction temperatures the rate of formation of undesirable halogenated alkane by-product unexpectedly decreases faster than the rate of formation of the desired product, so that choice of reaction temperature affords a means for reducing by-product contamination of the desired product.

I have made the additional discovery that in these reactions, conducted under superatmospheric pressures, the presence of an excess of ionizable fluoride salt MF unexpectedly reduces the yield and increases the relative amount of undesirable halogenated alkane by-product formed, so that control of the concentration of ionizable fluoride salt affords a means for further reducing by-product contamination of the desired product.

I have made the further discovery yet that when in these reactions, conducted under superatmospheric pressures, there is employed an excess of the halogen E, other factors being equal, there is unexpectedly obtained a further improvement in yield with accompanying reduction in reaction times.

Lastly, I have discovered that when the Reactions II(a), II(b), and II(c) illustrated above are conducted under superatmospheric pressure of at least about 10 p.s.i.g., in the absence of excess of ionizable fluoride MF, but employing an excess of the halogen E of at least about 10 percent over the stoichiometrically required amount, the desired product is obtained in surprisingly increased yields at substantially reduced reaction times, and under suppression of formation of undesirable halogenated alkane byproduct.

Particularly surprising is my discovery that employment of superatmospheric pressure, coupled with use of an excess of the halogen, under avoidance of the presence of free ionizable salt MF, preferably employing reaction temperatures below about 75° C., not only results in greatly increased yields and substantially shorten reaction times, but also results in substantial suppression of the side reaction. This is because it is known that the reaction of olefins, particularly perhalogenated olefins, with halogens to form perhalogenated alkanes is favored by superatmospheric pressures. So, for instance, it is stated in U.S. Pat. 2,424,667 to Raasch that attempts to add iodine to tetrafluoroethylene by passing tetrafluoroethylene at atmospheric pressure into an alcoholic solution of iodine were unsuccessful, but that sym. diiodotetrafluoroethane is obtained by reacting iodine with tetrafluoroethylene under pressures of at least 25 p.s.i.g. at temperatures between about 20° C. and 150° C. Hence, my discovery that under my reaction conditions the use of pressure does not increase the relative amounts of the halogenated alkane byproducts formed, but that instead there is a reduction in the relative amounts of undesirable by-products formed, is contrary to expectations.

DESCRIPTION OF THE PREFERRED EMBODIMENTS

The reaction of the fluorinated ketone or acyl fluoride with an ionizable fluoride salt to form a fluorinated organic salt, illustrated by Equation I above, proceeds readily at atmospheric pressure and room temperature upon admixture of the reactants. A preferred procedure is to add the fluorinated ketone or acyl fluoride to a suspension of the salt in a liquid medium which is a solvent or a partial solvent for the desired product. Suitable liquid media are inert polar solvents as for example lower alkyl nitriles such as acetonitrile, lower alkyl t-amides such as dimethyl formamide, butyrolactone, sulfolanes such as 2-methyl sulfolanes, and sulfones such as methyl ethyl sulfone. Acetonitrile is a preferred solvent.

The second reaction between the fluorinated organic salt, the olefin, and the halogen to form the fluorinated ether product as illustrated hereinabove by Equations II(a), II(b), and II(c) can be conveniently conducted in the same liquid medium as the first reaction and it is unnecessary to isolate the fluorinated organic salt formed in the first reaction but rather the olefin and halogen reactants can be added directly to the reaction mixture. It is also possible to conduct the first and second reactions concurrently in the same reaction medium, as may, for example, be accomplished by charging the fluorinated ketone or acyl fluoride together with the ionizable fluoride salt, the halogen and the olefin to the chosen reaction medium, and conducting the reaction under hereinafter described process conditions.

The improved process of the present invention is conducted under superatmospheric pressure of critically at least about 10 p.s.i.g. There appears to be no upper limits to the pressures which may be suitably employed other than those determined by the vapor pressures of the reactants and the reaction medium, and those dictated by practical considerations of equipment complexity and cost. Reaction pressures between about 10 p.s.i.g. and about 500 p.s.i.g. are preferred. More preferred yet are reaction pressures between about 50 p.s.i.g. and about 150 p.s.i.g. Improvements in yield and reaction times obtainable at pressures above about 150 p.s.i.g. tend to be insignificant in relation to the higher cost and complexity of the equipment required for operation at pressures of that order.

Reaction pressure, as herein used, is defined as the sum of the partial pressures of the reactants and the reaction medium. In those cases wherein the combined partial pressures of the reactants and the reaction medium at the chosen reaction temperature does not exceed about 10 p.s.i.g., no benefit accrues from conducting the reaction at superatmospheric pressures in excess of about 10 p.s.i.g. as e.g. could be accomplished by pressurizing the reaction vessel with an inert gas, such as nitrogen.

Reaction temperatures should be maintained between about −30° C. and 150° C. Preferred reaction temperatures lie between about 0° C. and 100° C. Halogenated alkane by-product formation is minimized by employing temperatures below about 75° C. The choice of the reaction temperature involves a compromise between short reaction times and low halogenated alkane by-product formation. Higher reaction temperatures result in shorter reaction times, but also give rise to increased formation of undesirable halogenated alkane by-product, and conversely, lower reaction temperatures require longer reaction times, but tend to reduce the amount of undesirable by-product formed. Thus, for example, in the reaction of the potassium salt of hexafluoroacetone with tetrafluoroethylene and iodine at about 70 p.s.i.g. pressure, employing the potassium salt and the iodine in a 1:2 molar ratio, at a reaction temperature of about 50° C. to 58° C. the reaction proceeds to essential completion within a period of about 1 hour, whereas under otherwise identical condition, but at a reaction temperature of about 5° C. to 6° C. the reaction requires about 6 hours to proceed to substantial completion. However, under the latter conditions the amount of sym. diiodotetrafluoroethane by-product is only about $\frac{1}{60}$ of that obtained in the reaction conducted at about 50 to 58° C.

Yields are improved, and formation of undesirable halogenated alkane by-product is minimized, by conducting the second reaction between the fluorinated organic salt, the olefin, and the halogen as illustrated hereinabove by Equations II(a), II(b), and II(c) under exclusion of an excess of ionizable fluoride salt MF. Excess ionizable fluoride salt MF will not normally be present in the reaction mixture in significant quantities when the fluorinated organic salt prior to use in the second reaction is isolated from the medium in which it is prepared and is purified before being charged to the second reaction. However, when first and second reactions are to be conducted in the same reaction medium, either sequentially or concurrently, use of ionizable fluoride in excess of about stoichiometrically required amounts should critically be avoided. I have found, and surprisingly so, that presence of excess ionizable fluoride salt MF in the second reaction decreases the yield of the desired ether product, and drastically increases formation of undesirable halogenated alkane by-product. On the other hand, a deficiency of ionizable fluoride salt MF results in waste of fluorinated ketone or acyl fluoride material. Hence, fluorinated ketone or acyl fluoride and ionizable fluoride salt MF are critically employed in about stoichiometric proportions, say in molar ratios between about 0.6:1.5, more preferably about 0.8:1.2 mols of fluorinated ketone or acyl fluoride to ionizable fluoride salt MF.

With respect to the amount of halogen E to be employed in the second reaction, I have surprisingly found that yields of desired fluorinated ether are increased, and reaction times are shortened by providing a critical excess of halogen E in the second reaction. Critically, this excess is at least about 10 percent over stoichiometrically required amount. While the process is operable using stoichiometric or less than stoichiometric amounts of halogen E, a deficiency of halogen E will necessarily reduce yield of the desired fluorinated ether. On the other hand, use of an excess of halogen E in amount at least about 10 percent over stoichiometric requirements substantially increases yield. So, for example, I have found that in the reaction of the potassium salt of hexafluoroacetone with iodine and tetrafluoroacetone, when using double the stoichiometrically required amount of iodine, there is obtained about twice the amount of perfluoroisopropoxyethyl iodide product that is obtainable under otherwise identical reaction conditions, but employing iodine in stoichiometric amount. The halogen E therefore is employed in excess of critically at least 10 percent over stoichiometric amount, preferably in about 1.5 to about 3 times stoichiometric amount. Use of more than about 3 times stoichiometric amount serves no useful purpose, hence is preferably avoided.

The amount of olefin charged to the reactor is essentially the amount that is actually consumed in the reaction plus that amount necessary to maintain the pressure reactor at the chosen reaction pressure, if the olefin is gaseous at the chosen reaction temperature and the reaction pressure is supplied by the vapor pressure of the olefin.

If the olefin is tetrafluoroethylene, reaction pressures are preferably kept below about 200 p.s.i.g. to avoid hazards of explosion. Tetrafluoroethylene is normally supplied containing a polymerization inhibitor such as e.g., α-pinene. The inhibitor does not adversely effect the reaction and need not be removed, although it may be removed, if desired. For safety reasons it is preferred not to remove the inhibitor.

Upon conclusion of the reaction the sought-for fluorine containing ether product may be separated from the reaction mixture by conventional means, such as fractional distillation. If desired, water miscible solvents, if employed, and water soluble halide salts may be separated from the reaction mixture by water extraction. Unreacted halogen may be converted to a halide salt by treatment with a suitable reducing agent, such as, e.g. sodium sulfite, to render it water extractable.

With respect to the fluorinated ketones and acyl fluorides having the formula

wherein $R_1$ and $R_2$ are independently either fluorine or a

radical wherein $R_3$ and $R_4$ are Cl, F, or alkyl or haloalkyl groups, or, taken together, are alkylene or haloalkylene groups forming a cycloaliphatic structure, with the proviso that at least one of $R_1$ and $R_2$ is

those wherein $R_3$ and $R_4$ are F, Cl or are alkyl or haloalkyl groups having from 1 to about 6 carbons are preferred, those having from 1 to about 2 carbons being more preferred yet. Most preferred are those wherein $R_3$ and $R_4$ are both Cl or F. Hexafluoroacetone, monochloropentafluoroacetone, and sym. dichlorotetrafluoroacetone are specific examples of preferred embodiments.

With respect to the ionizable fluoride salt MF wherein M is a member selected from the group consisting of potassium, cesium, silver, rubidium and tetraalkyl ammonium ions; potassium and cesium are preferred embodiments, potassium being most preferred.

With respect to the olefins, $CF_2=CF_2$, $CF_2=CH_2$, $CFH=CH_2$, $CH_2=CH_2$, $CF_2=CFCl$, $CF_2=CFBr$ $CF_2=CHCl$, $CH_2=CHCl$ are preferred, $CF_2=CF_2$, $CF_2=CH_2$, and $CH_2=CH_2$ being most preferred.

With respect to the halogen E employed in the second reaction, iodine is the preferred embodiment.

The following examples are given to further illustrate the practice of the present invention, but are not intended to be a limitation thereon. In these examples the yield is defined as the percentage of the amount of final product actually obtained in relation to the amount theoretically possible, on the basis of the fluorinated ketone charged to the process.

EXAMPLE 1

Into a dry 3-necked 1 liter round bottomed flask equipped with an agitator, a dry-ice acetone cooled condenser, and a gas inlet tube extending below the liquid level were placed 750 ml. of acetonitrile and 25.5 grams (0.44 mol) of anhydrous potassium fluoride. Under constant agitation 76.7 grams (0.46 mol) of gaseous hexafluoroacetone were introduced through the gas inlet tube over a period of 2 hours. The hexafluoroacetone, at essentially room temperature, reacted with the potassium fluoride to form a solution of an ionizable potassium salt of hexafluoroacetone in acetonitrile.

The solution thus obtained was placed into a dry glass pressure reactor of 1.5 liter capacity equipped with a mechanical stirrer and heating and cooling coils. To the solution in the autoclave were added 247.8 grams (0.975 mol) of iodine and the free space in the reactor was purged with gaseous tetrafluoroethylene. The reactor was then pressurized with gaseous tetrafluoroethylene obtained from a pressurized cylinder to a pressure of 72 lbs./sq. in. gauge, and was maintained at this pressure throughout the reaction by addition of tetrafluoroethylene from the cylinder via a pressure regulator. Reactor contents, under constant agitation, were maintained at a temperature of between 20° C. and 28° C. throughout the reaction. After about 3.5 hours tetrafluoroethylene flow through the pressure regulator essentially ceased, indicating completion of the reaction. The reactor was vented, and its contents were drowned in 3 liters of ice water. A solution of sodium sulfite was added until all the iodine was reduced and the solution became colorless. The organic layer was separated by decantation and was fractionally distilled to give 127.5 grams (0.31 mol) of perfluoroisopropyl-2-iodotetrafluoroethyl ether having a boiling point of 86° C.–87° C./760 mm. Hg and a refractive index at 25° C. of 1.3155, in 70.5 percent yield, and 15.7 grams (0.044 mol) of sym. diiodotetrafluoroethane boiling at 114° C./760 mm. Hg. The mol ratio of perfluoroisopropyl-2-iodotetrafluoroethyl ether to sym. diiodotetrafluoroethane was 1:0.14.

EXAMPLES 2–7

The procedure of Example 1 was repeated employing the reactants in various mole ratios, and employing various reaction temperatures and reaction pressures. The results are summarized in the table below.

TABLE

| Example: | KF, mol | $(CF_3)_2CO$, mol | Iodine, mol | Reaction pressure, p.s.i.g. | Reaction temperature, ° C. | Reaction time, hrs. | A, mols $(CF_3)_2CFO\cdot CF_2CF_2I$ | B, mols $CF_2I\cdot CF_2I$ | Percent yield of $(CF_3)_2CFO\cdot CF_2CF_2I$ | Mol ratio, A:B |
|---|---|---|---|---|---|---|---|---|---|---|
| 2 | 2.0 | 1.0 | 1.0 | (¹) | 26 | 20 | 0.17 | | 17.0 | |
| 3 | 0.46 | 0.46 | 0.5 | 31 | 51 | 3.5 | 0.132 | | 28.7 | |
| 4 | 0.44 | 0.44 | 0.5 | 73 | 54 | 3.25 | 0.197 | 0.041 | 45.0 | 1:0.21 |
| 5 | 0.43 | 0.43 | 0.99 | 71 | 54 | 1 | 0.289 | 0.134 | 67.0 | 1:0.46 |
| 6 | 0.44 | 0.46 | 1.02 | 73 | 14 | 3.25 | 0.275 | 0.011 | 58.5 | 1:0.04 |
| 7 | 0.46 | 0.51 | 1.0 | 72 | 5–6 | 6.25 | 0.215 | 0.0025 | 47.0 | 1:0.01 |

¹ Atmospheric.

When the reaction of the ionizable salt with tetrafluoroethylene and iodine is repeated in accordance with the procedure outlined in Example 1, but is conducted at a reaction pressure of 10 p.s.i.g. the reaction proceeds to essential completion in about 8 hours, and yield of the desired perfluoroisopropyl-2-iodotetrafluoroethyl ether is about 25 percent.

When other starting materials within the purview of the present invention are used in the improved process of my invention, similar results are obtained, that is to say, improved yields are obtained at substantially shortened reaction times and under substantially reduced halogenated alkane by-product formation.

From the foregoing it will be appreciated that use of superatmospheric reaction pressure alone or in combination with employment or observation of any one of the other elements of the improvement of the present invention, viz. maintenance of reaction temperatures within certain limits, critical avoidance of presence of excess ionizable fluoride salt, and use of a critical minimum excess of halogen, will give improved process results, viz. either improved yields, shortened reaction times, reduced halogenated by-product formation, or a combination thereof. Optimum results are achieved by combination of using superatmospheric pressure of at least 10 p.s.i.g., maintaining the reaction temperature below about 75° C., avoiding the presence of ionizable fluoride salt in excess of about stoichiometric amount, and using the halogen in critical minimum excess of at least 10 percent over stoichiometric amount.

This invention may be embodied in other forms, or carried out in other ways, without departing from the spirit or essential characteristics thereof. The present embodiment is, therefore, to be considered in all respects as illustrative and not restrictive, the scope of the invention being indicated by the appended claims.

I claim:

1. In the method for preparing $(CF_3)_2CFOCF_2CF_2I$ which comprises reacting a fluorinated organic salt of the formula $(CF_3)_2CFO^-M^+$, wherein M is a member selected from the group consisting of silver, potassium, rubidium, cesium and tetraalkyl ammonium ions, with $CF_2=CF_2$ and iodine in the presence of an inert solvent, at temperatures in the range of $-30$ to $150°$ C., and recovering $(CF_3)_2CFOCF_2CF_2I$ from the reaction mixture; the improvement which comprises conducting the reaction under superatmospheric pressure from about 31 to 500 p.s.i.g.

2. The method of claim 1 in which the fluorinated organic salt is $(CF_3)_2CFO^-K^+$.

3. The method of claim 2 in which the reaction is conducted under superatmospheric pressure from about 31 to 150 p.s.i.g.

4. The method of claim 3 in which the reaction temperature is maintained between about 0° C. and 100° C.

5. The method of claim 4 in which the reaction temperature is maintained between about 5° C. and 75° C.

6. The method of claim 5 in which the iodine is employed in an amount between about 1.5 to about 3 times the stoichiometric amount.

7. The method of claim 6 wherein the $(CF_3)_2CFO^-K^+$ salt is obtained by reacting in an inert solvent a compound of the formula $(CF_3)_2C=O$ with KF, and wherein the reaction of $(CF_3)_2CFO-K^+$ with $CF_2=CF_2$ and iodine is conducted in the same inert solvent.

References Cited

UNITED STATES PATENTS

| 3,331,813 | 7/1967 | Pittman et al. | 260—614F |
| 3,382,222 | 5/1968 | Pittman et al. | 260—614F |
| 3,453,333 | 7/1969 | Litt et al. | 260—614F |

HOWARD T. MARS, Primary Examiner

U.S. Cl. X.R.

252—351; 260—48.4, 514, 611, 633